B. S. STEPHENSON.
SURGICAL INSTRUMENT.
APPLICATION FILED OCT. 9, 1907.
911,627.
Patented Feb. 9, 1909.
2 SHEETS—SHEET 1.
Fig. 1.
Fig. 3.
Fig. 2.
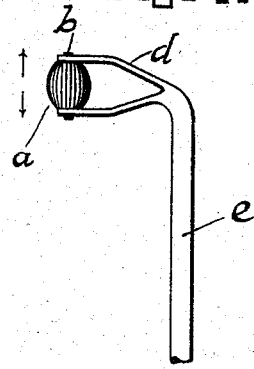
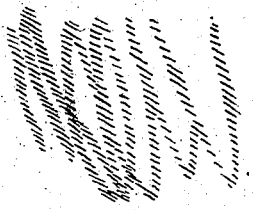
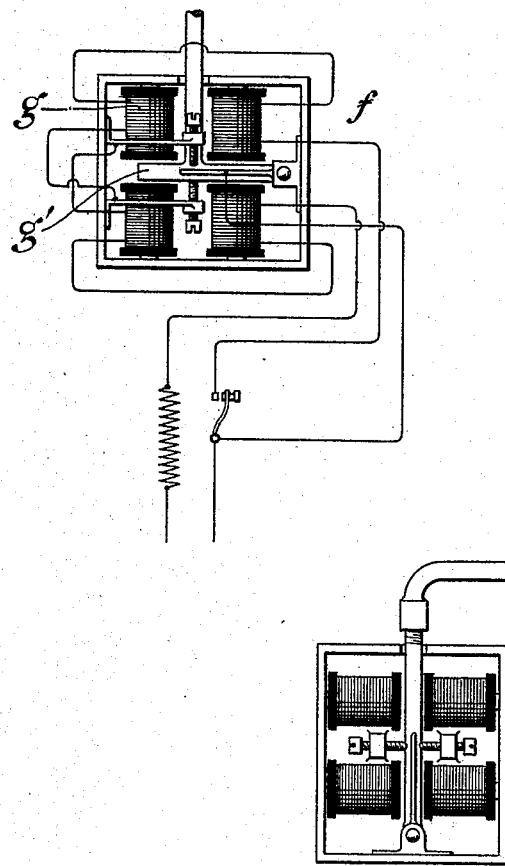
WITNESSES
J Clyde Ripley.
Alice M. Parker
INVENTOR
BENJAMIN S. STEPHENSON.
BY
W. H. Parker
ATTORNEY

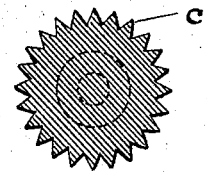

UNITED STATES PATENT OFFICE.

BENJAMIN S. STEPHENSON, OF BROOKLYN, NEW YORK, ASSIGNOR TO THE PHONO PNEUMATIC COMPANY, A CORPORATION OF NEW YORK.

SURGICAL INSTRUMENT.

No. 911,627.      Specification of Letters Patent.      Patented Feb. 9, 1909.

Application filed October 9, 1907. Serial No. 396,547.

*To all whom it may concern:*

Be it known that I, BENJAMIN S. STEPHENSON, a citizen of the United States, and a resident of Brooklyn, in the county of Kings and State of New York, (whose post-office address is 116 Montague street, Brooklyn, New York,) have invented certain new and useful Improvements in Surgical Instruments, of which the following is a full, clear, and exact description, whereby any one skilled in the art may make and use the same.

The invention relates to implements for use in connection with a vibrating mechanism for securing a treatment and cure of hypertrophical tissues of the human body and diseased or abnormal parts.

It relates particularly to implements adapted to be used with a vibrating mechanism for securing a scarifying action upon diseased tissue or tissues needing treatment.

The object of the invention is to provide a simple, economical and effective implement for treating portions of the human body without the use of the lancet or knife, and has for a particular object the treatment, by scarification, of affections of the mucous membrane.

A further object is to provide an implement which will be effective, through its scarifying or crimping action, to cure through external means afflictions of the mucous membrane, thus avoiding attendant dangers of anesthesia and operations by the knife, snare, cautery or curette.

A further object is to provide an implement or implements which in connection with a vibratory mechanism and manual operation may be used for successful treatment of adenoids, enlarged tonsils, turbinates and polypoid growths, as well as for uterine treatments.

Referring to the drawings: Figure 1 illustrates one form of device, particularly adapted for the treatment of enlarged tonsils illustrated as applied to a vibrating mechanism. Fig. 2 shows a similar vibratory mechanism with an implement of the proper form to treat turbinates and polypoid growths. Fig. 3 illustrates the effect of the instrument in use upon any tissue. Fig. 4 illustrates the instrument in proper form for the treatment of adenoids or growths in the throat or larynx. Fig. 5 is a detailed view of the instrument illustrated in connection with Fig. 1 for the treatment of enlarged tonsils. Fig. 6 is a modified form of the instrument illustrated in Fig. 5. Fig. 7 is a detailed view of the instrument employed in the treatment of enlarged turbinates and polypoid growths. This instrument is further illustrated in Fig. 2 in connection with the vibrator. Fig. 8 shows one form of an instrument suitable for use in uterine treatments. Fig. 9 is a cross sectional view through the scarifying bur.

Many diseases or instances of hypertrophical tissue are usually and ordinarily operated upon surgically by cutting or scraping, and it is the object of the present invention to produce a means for avoiding such cutting or scraping operations and to cure or benefit the diseased tissues by vibratory scarifying implements.

The implement is so constructed as to have a peculiar crimping action upon the tissue when used, and whether or not it actually cuts the tissue or merely crimps it, as might be done in certain cases, its action is most beneficial. The scarifications are so minute and frequent that they act substantially as an intense counter-irritant which causes a puckering or contraction of the afflicted tissues which ultimately contract and are reduced to a normal condition without removal of any substantial part thereof by a knife.

The invention consists essentially of a bur $a$ which is preferably of substantial elliptical form and has running from end to end thereof substantially parallel with its axis $b$ a series of scarifying edges $c$. This bur, as illustrated in all instances except in Fig. 8, is rotarily mounted on its pivot or axis $b$ in the bifurcated end $d$ of a handle $e$. The handle is arranged to be secured to any suitable vibrating mechanism, such as illustrated somewhat in diagram at $f$.

As herein shown in Fig. 1 the vibrator consists of a set of electro magnets $g$ acting on an armature $g'$ to effect a movement of the handle $e$ with its scarifying bur $a$ axially of the axis of said bur and in line with the cutting edges or teeth $c$. The vibratory movement in Figs. 1 and 2 is indicated by the arrows. Of course it is understood that the vibrator gives almost an infinite number of vibrations within the shortest period of time, and of course the number or frequency of the vibrations may be varied to suit the exigencies for any case. Figs. 1 and 2 are merely illustrative of the direction of vibration of the scarifying roll or bur.

In Fig. 8 the bur, as illustrated, is mounted upon a pivot extending from the end of the handle, and in Fig. 6 the bur is illustrated as of elliptical form with very slight cutting teeth. In fact, for treatment in some cases the teeth may be made hardly appreciable, and yet when used in the instrument with a particular method of vibration, herein defined, will be effective for crimping the tissue to the desired degree to secure proper stimulation and shrinkage.

In Fig. 3 an attempt has been made to illustrate the peculiar action of the instrument upon the surface to be treated. Of course in use the instrument is rapidly vibrated axially of the bur and while so vibrated is rolled over the affected tissue, the result is a distinct angular scarification, as illustrated in Fig. 3, which may be increased or decreased at the will of the operator.

Attention is called to the peculiar effect of the rapid vibrations axially of the bur combined with a rolling movement performed by the operator transverse to the axis of the roll. If the bur is merely rolled by the operator over the surface on its axis, there is not the same transverse cutting effect as secured by such a rolling action combined with a very rapid axial vibratory movement—in fact, it is the combined movements upon the instrument which effect the most desirable result.

The size and form of the instrument may of course be varied according to any particular requirement, several forms being illustrated in the accompanying drawings, and of course it is understood that the instrument may be applied to any desired affected part and must be of such a form as may be inserted within a particular passage of the body requiring treatment. Its contour may be varied for any particular passage and the location of the tissue to be treated.

In practice the various parts of the instrument should be made of a metal suitable to be effectively sterilized.

What I claim as my invention and desire to secure by Letters Patent is:

1. A scarifier consisting of a handle, and a scarifying bur rotarily mounted therein and provided with fine cutting teeth.

2. A scarifier consisting of a handle, a scarifying bur rotarily mounted therein, and provided with cutting teeth, and means for vibrating said bur in the direction of its axis.

3. A scarifying instrument comprising a handle, an elliptical roll journaled to rotate in said handle, cutting teeth extending from end to end of said roll, and means for vibrating said roll in an axial direction.

BENJAMIN S. STEPHENSON.

Witnesses:
GODFREY N. NELSON,
ALICE M. PARKER.